United States Patent [19]

Agarwal et al.

[11] Patent Number: 4,761,741
[45] Date of Patent: Aug. 2, 1988

[54] ANTI-LOCK BRAKE CONTROL SYSTEM

[75] Inventors: Paul D. Agarwal, Troy; Alexander Kade, Grosse Pointe Woods, both of Mich.

[73] Assignee: General Motors Corporation, Detroit, Mich.

[21] Appl. No.: 882,788

[22] Filed: Jul. 7, 1986

[51] Int. Cl.$^4$ ............................................. B60T 8/60
[52] U.S. Cl. ................................. 364/426; 303/100; 303/DIG. 4; 180/197
[58] Field of Search ............... 364/426; 180/197; 303/95, 100, 104, 112, DIG. 4

[56] References Cited

U.S. PATENT DOCUMENTS

| | | | |
|---|---|---|---|
| 3,547,500 | 12/1970 | Riordan | 303/104 |
| 3,762,775 | 10/1973 | Ochiai | 303/DIG. 4 |
| 4,094,555 | 6/1978 | Byrne et al. | 303/100 |
| 4,335,431 | 6/1982 | Takahashi | 303/95 |
| 4,576,419 | 3/1986 | Leiber | 303/DIG. 4 |
| 4,653,816 | 3/1987 | Lin | 364/426 |
| 4,673,225 | 6/1987 | Kade | 303/100 |

Primary Examiner—Gary Chin
Attorney, Agent, or Firm—Howard N. Conkey

[57] ABSTRACT

A brake control system is described that prevents a wheel lockup condition by identifying the brake pressure that produces the maximum possible braking effort during each brake pressure application period and applying a predetermined fraction of the identified pressure after an incipient wheel lockup condition is sensed. One criteria for sensing an incipient wheel lockup condition is the decrease in the braking effort from the maximum possible braking effort by a predetermined amount as wheel slip increases from a critical slip value.

6 Claims, 4 Drawing Sheets

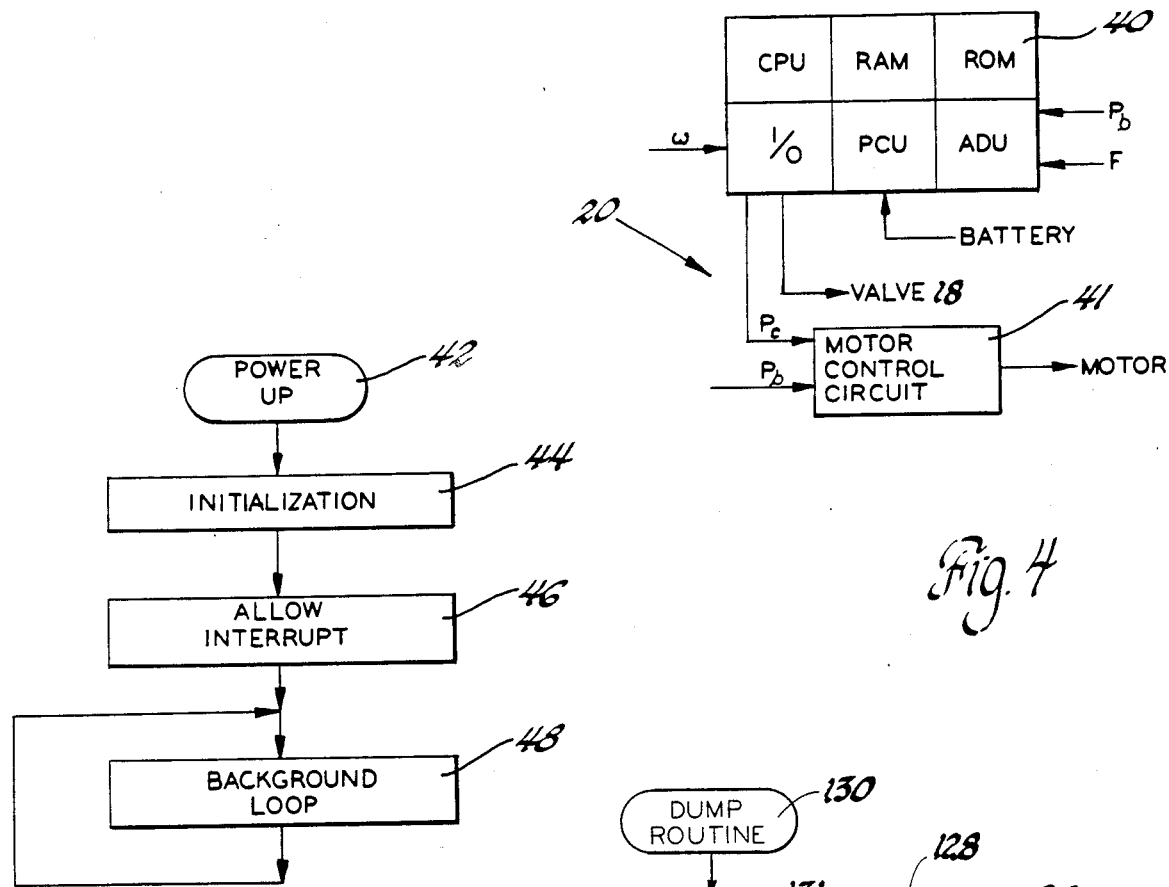
Fig. 4
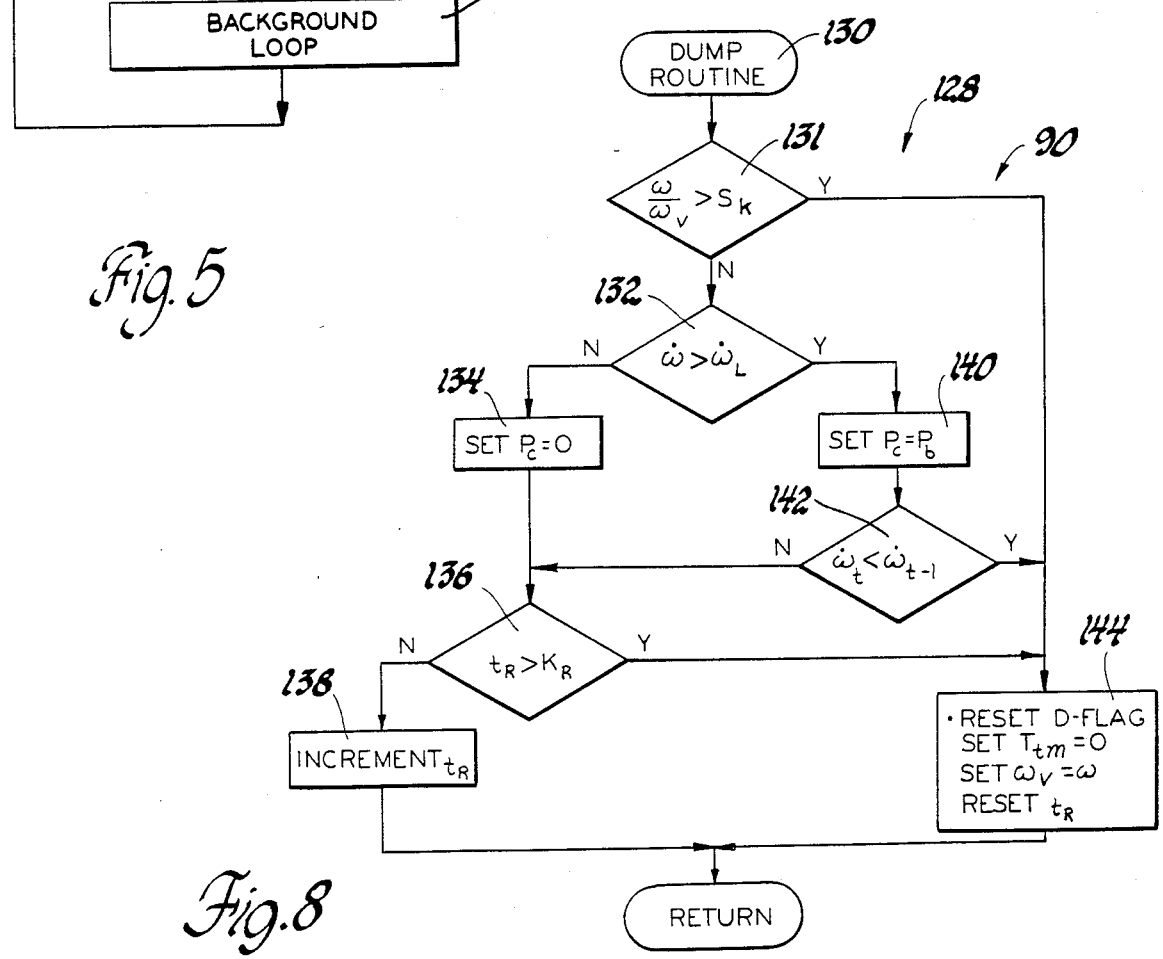
Fig. 5
Fig. 8

ANTI-LOCK BRAKE CONTROL SYSTEM

BACKGROUND OF THE INVENTION

This invention relates to an anti-lock control system for vehicle wheel brakes.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reduced vehicle stopping distance and a deterioration in the lateral stability of the vehicle.

U.S. application Ser. No. 789,576 now U.S. Pat. No. 4,664,453 filed on Oct. 21, 1985 and assigned to the assignee of this invention describes a wheel lock control system for preventing the wheels of a vehicle from locking up while being braked. In this system, the wheel brake pressure that results in the wheel slip being at the critical slip value and which produces the maximum braking force between the tire and the road surface is identified. When an incipient wheel lockup condition is detected, the brake pressure so identified is then applied to the wheel brake so as to substantially continuously establish the critical slip value between the wheel and the road surface resulting in the maximum possible braking effort.

The brake pressure producing the critical slip value and therefore the maximum braking force is identified in the above system by repeatedly calculating the braking force between the wheel and the road surface during braking based on an equation defining the motion of a free body consisting of the wheel, tire and the brake. This equation utilizes measured values and system constants that are based on, for example, brake lining coefficient of friction and area and wheel radius. The brake pressure corresponding in time to the peak calculated force is stored. When an incipient wheel lockup is detected indicating that the critical wheel slip value establishing the peak braking force between the wheel and road surface has been exceeded, the stored brake pressure is the pressure that produced the peak braking force. After detection of an incipient wheel lockup condition, the process of identifying the pressure producing the peak braking force is ended and the brake pressure is dumped to allow the wheel to recover from the incipient lockup condition. When recovery is sensed, the stored brake pressure that produced the peak braking force is reestablished to establish a braking condition in which the wheel slip is substantially at the critical slip value for the existing road-tire interface condition.

In the systems set forth in the U.S. application Ser. No. 789,576 now U.S. Pat. No. 4,664,453, a wheel lockup condition is sensed based on wheel deceleration or wheel slip exceeding specified values.

SUMMARY OF THE INVENTION

In accord with this invention, one of the criteria for determining an impending wheel lockup condition in an anti-lock brake control system is based on the decrease in the calculated braking force from an identified peak braking force as wheel slip increases during braking. In the preferred embodiment of this invention, during wheel lock controlled braking, the control system repeatedly calculates the braking force between the wheel and the road surface while pressure is applied to the wheel brake and stores the peak value calculated. If the wheel slip exceeds the critical wheel slip value producing the maximum possible braking force between the wheel and road surface, the calculated braking force decreases from the stored peak value. When the calculated braking force decreases from the peak value by a predetermined amount, an incipient wheel lockup condition is indicated that results in a dump of the wheel brake pressure. By use of this criteria in determining an incipient wheel lockup condition as opposed to wheel deceleration, for example, false dumps of the wheel brake pressure that may otherwise result from noise or rapid increases in brake pressure are avoided.

DESCRIPTION OF THE DRAWINGS

The invention may be best understood by reference to the following description of a preferred embodiment and the drawings in which:

FIG. 4 is a diagram of the electronic controller of FIG. 2 that is responsive to brake system parameters for controlling the brake pressure to inhibit wheel lockup in accord with the principles of this invention; and FIGS. 5 thru 8 are diagrams illustrating the operation of the engine controller of FIG. 4.

DESCRIPTION OF THE PREFERRED EMBODIMENT

Figure 1:
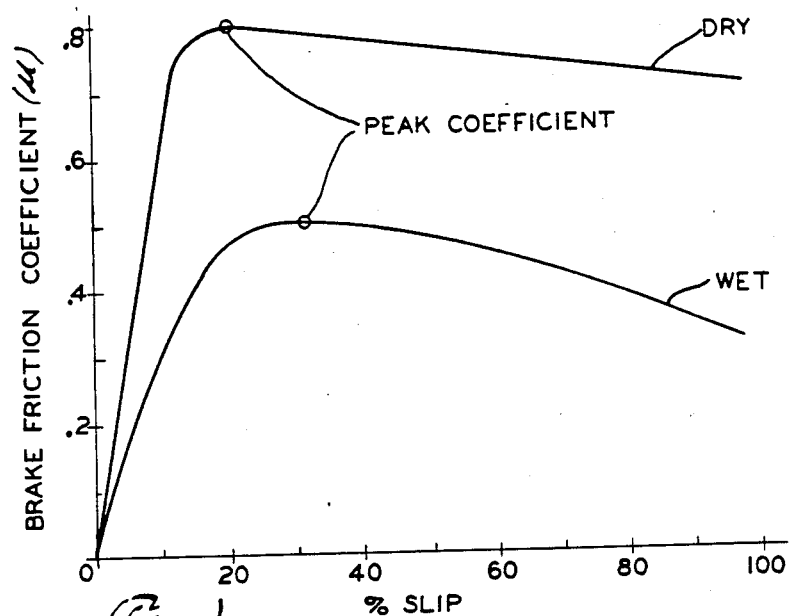
FIG. 1 is a diagram illustrating the brake force coefficient between a wheel and a road surface as a function of the percentage slip between the wheel and road surface for two road surface condition.

A wheel under the influence of braking has two major torques acting on it: brake torque and tire torque. Brake torque arises from the application of brake pressure through the brake mechanism and tire torque is generated by the friction of the tire-road interface as wheel slip occurs.

Brake torque $T_b$ is assumed to be proportional to brake pressure $P_b$ with a known brake gain $K_b$ and is defined by the expression $$T_b = P_b K_b. \qquad (1)$$

Tire torque $T_t$ is related to the brake force coefficient $\mu$ between the tire and the road surface, the normal load N on the tire and the wheel rolling radius R and is defined by the expression $$T_t = \mu N R. \qquad (2)$$

For the free body consisting of the brake, wheel, and tire, the equation of motion is $$I_w \dot{\omega} + T_b - T_t = 0 \qquad (3)$$

where $I_w$ is the wheel moment of inertia and $\dot{\omega}$ is the wheel angular acceleration. When the difference between the tire torque and the brake torque is positive, the wheel accelerates; and when negative, the wheel decelerates.

Combining expressions 1 and 3, tire torque $T_t$ is defined as $$T_t = I_w \dot{\omega} + P_b K_b. \qquad (4)$$

As can be seen, the tire torque can be calculated from values that are either known or can be measured. The wheel moment of inertia $I_w$ and the brake gain $K_b$ are known values, the value of brake pressure $P_b$ can be measured and $\dot{\omega}$ can be determined by differentiating the value of wheel speed which can be measured.

The brake friction coefficient term $\mu$ of the tire torque $T_t$ is a nonlinear function of the magnitude of slip between the wheel and the road surface during braking and is dependent upon the road surface condition. FIG. 1 illustrates the brake friciton coefficient $\mu$ as a function of percentage-wheel slip for two road surface conditions. For a given road surface, it can be seen that as wheel slip is increased in response to increased brake torque $T_b$, the brake friction coefficient $\mu$ and therefore the tire torque $T_t$ increases until a critical slip value at which the brake friction coefficient and the tire torque are at a maximum. A further increase in wheel slip results in a decrease in the tire torque due to a decrease in the brake friction coefficient and high wheel deceleration values. The maximum tire torque resulting in a maximum braking effort for a given road surface is achieved when the brake torque $T_b$ produces the critical wheel slip value. When the braking effort produces a wheel slip exceeding the critical slip value, the braking operation becomes unstable and typically results in sudden wheel lockup which in turn results in increased stopping distance and a deterioration in the steering and lateral stability of the vehicle.

In general, the brake control system identifies the value of the braking pressure $P_b$ that produces the maximum tire torque $T_t$. This is accomplished by continuously calculating the tire torque value $T_t$ of equation (4) during braking. Any time the calculated value is larger than any previously calculated value, the value of the tire torque and the braking pressure $P_b$ is stored so that the maximum tire torque and brake pressure producing it are known. When an incipient wheel lockup is detected, the brake pressure is dumped to allow the wheel speed to recover and the brake pressure is thereafter reapplied to the stored value to establish a braking condition in which the wheel slip is substantially at the critical slip value for the existing road surface condition. This results in substantially the maximum possible tire torque $T_t$ and minimum stopping distance for the road surface condition.

In accord with this invention, a predetermined decrease in the calculated tire torque from the stored peak value is used as one parameter to sense an incipient wheel lockup condition. Calculated tire torque includes a portion based on brake pressure and a portion based on wheel deceleration as illustrated in the equation (4) and is used in determining a wheel lockup condition in place of wheel deceleration alone. This provides a condition representing an incipient wheel lockup that is less sensitive to noise and further which does not initiate a false dump of brake pressure as a result of high wheel deceleration resulting from rapid increases in the applied brake pressure.

Figure 2:
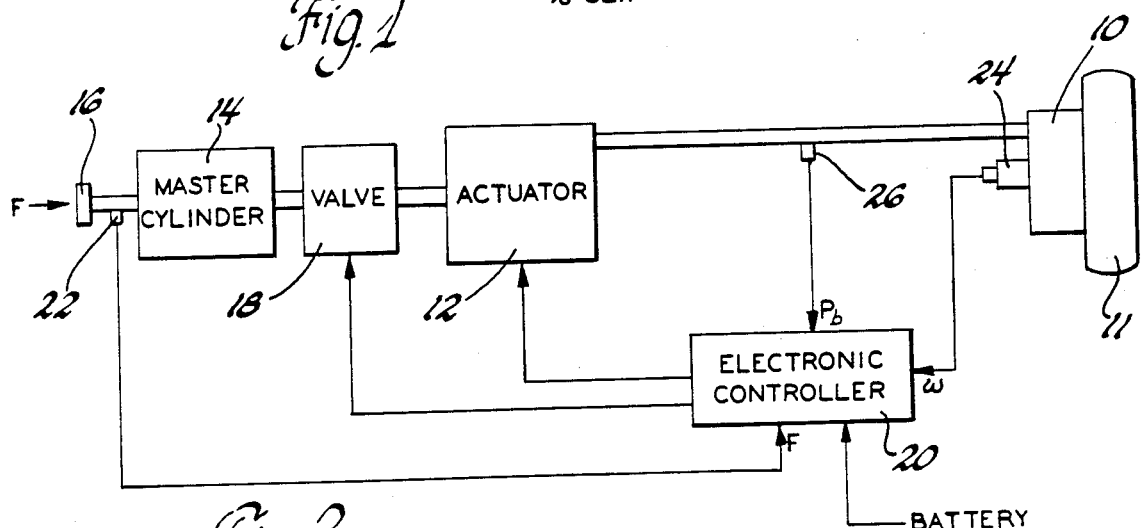
FIG. 2 is a general diagram of the braking system for controlling the brakes in accord with the principles of this invention.

A general overview of the wheel lock control system is illustrated in FIG. 2. The control of the brake of a single wheel is illustrated, it being understood that the control of the brakes of the remaining wheels of the vehicle are identical thereto. A standard wheel brake 10 for a wheel 11 is actuated by controlled hydraulic pressure from one of two sources. The primary source is a motor driven actuator 12 and the secondary source is a standard master cylinder 14 controlled directly by the vehicle brake pedal 16. A normally open electromagnetic valve 18 is energized when the actuator 12 is operative to control the hydraulic pressure to the brake 10 so as to decouple the master cylinder 14 and brake pedal 16 from the hydraulic pressure output of the actuator 12. This prevents pressure feedback to the vehicle operator while brake pressure is controlled by the actuator 12. When the electromagnetic valve 18 is deenergized, the hydraulic pressure to brake 10 may be modulated directly by the brake pedal 16 and master cylinder 14.

The valve 18 is deenergized only during limited vehicle operating conditions such as low vehicle speed or during failed conditions of the primary hydraulic pressure source to permit brake pressure modulation by the master cylinder 14. At all other times, the valve 18 is energized to decouple the master cylinder 14 from the braking system.

An electronic controller 20 is responsive to the outputs of a brake pedal force sensor 22 providing a signal that is a measure of the operator applied brake pedal force F, a wheel speed sensor 24 that provides a signal that is a measure of wheel speed $\omega$, and a pressure sensor 26 that provides a signal that is a measure of the hydraulic brake pressure $P_b$ applied to the brake 10 from the master cylinder 14 or the actuator 12. The electronic controller 20 is responsive to those signals to (a) energize the valve 18 when the wheel speed $\omega$ exceeds a value corresponding to a low vehicle speed such as 3 mph, (b) control the actuator 12 so as to apply a hydraulic pressure $P_b$ to the brake 10 that is proportional to the brake force F times a gain constant G for providing power assist during normal braking conditions, and (c) limit the pressure $P_b$ applied to the brake 10 to a value that results in the maximum possible tire torque $T_t$ for the road surface condition to prevent wheel lockup and to provide for the shortest possible stopping distance, lateral vehicle stability and controllable vehicle steering.

Figure 3:
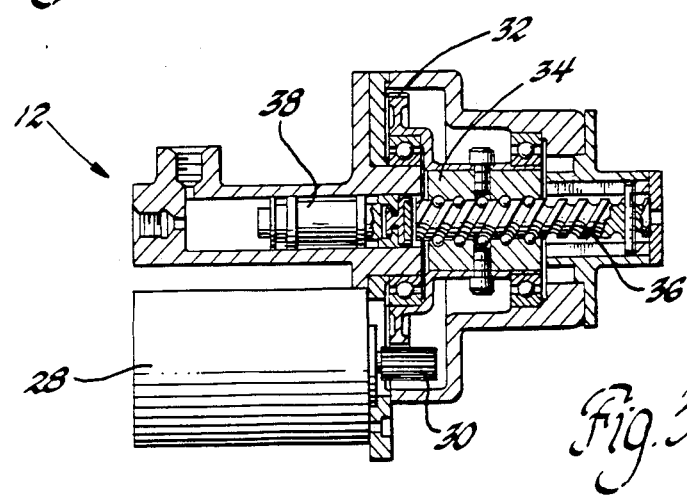
FIG. 3 is a longitudinal cross-sectional view of the actuator of FIG. 2 for modulating the brake pressure to prevent wheel lockup.

Referring to FIG. 3, the actuator 12 in the preferred embodiment includes a DC torque motor 28 whose output shaft drives an input gear 30 which in turn rotatably drives an output gear 32. The drive member 34 of a ball screw actuator is secured for rotation with the output gear 32. The drive member 34 engages and axially positions the driven member 36 of the ball screw actuator. The driven member 36 drives a piston 38 to control the hydraulic pressure output of the actuator 12. The torque output of the motor 28 is translated to a directly related hydraulic pressure $P_b$ output of the actuator 12 that is applied to the brake 10.

The motor 28 current may be used as a measure of the brake pressure $P_b$ in place of the sensor 26 since the torque output of the motor 28 and therefore the hydraulic pressure $P_b$ is related to the motor current.

As specifically illustrated in FIG. 4, the electronic controller 20 takes the form of a digital computer 40 and a motor control circuit 41. The digital computer is standard in form and includes a central processing unit (CPU) which executes an operating program permanently stores in a read-only memory (ROM) which also stores tables and constants utilized in controlling the hydraulic pressure input to the brake 10. Contained within the CPU are conventional counters, registers, accumulators, flag flip flops, etc. along with a clock which provides a high frequency clock signal.

The computer 40 also includes a random access memory (RAM) into which data may be temporarily stored and from which data may be read at various address locations determined in accord with the program stored in the ROM. A power control unit (PCU) receives battery voltage and provides regulated power to the various operating circuits in the electronic controller 20.

The computer 40 further includes an input/output circuit (I/O) that in turn includes a discrete output section controlled by the CPU to provide a control signal to the valve 18. In controlling the brake 10, the computer outputs a digital signal to the motor control circuit 41 via the I/O representing a desired value of the hydraulic brake pressure. The motor control circuit 41 converts the digital signal representing the desired pressure to an analog signal which is compared with the actual measured value of the brake pressure $P_b$. By standard closed loop adjustment that may include both proportional and integral terms, the motor 28 current is controlled so that the actual measured brake pressure $P_b$ is made equal to the desired pressure.

The I/O also includes an input counter section which receives a pulse output from the wheel speed sensor 24 having a frequency representing wheel speed $\omega$. Wheel speed $\omega$ is then determined by counting clock pulses between wheel speed pulses.

An analog-to-digital unit (ADU) is included which provides for the measurement of analog signals. The analog signals representing conditions upon which the hydraulic brake pressure to the brake 10 is based are supplied to the ADU. In the present embodiment, those signals include the brake pressure value $P_b$ from the pressure sensor 26 and the output of the brake pedal force sensor 22 providing a measure of the pedal force F. The analog signals are sampled and converted under the control of the CPU and stored in ROM designated RAM memory locations.

The operation of the electronic controller 20 in controlling the hydraulic brake pressure $P_b$ to the brake 10 is illustrated in the FIGS. 5–8. Referring first to FIG. 5, when power is first applied to the system such as when the vehicle ignition switch is rotated to its "on" position, the computer program is initiated at point 42 and then proceeds to a step 44 where the computer 40 provides for system initialization. For example, at this step initial values stored in the ROM are entered into ROM designated RAM memory locations and counters, flags and timers are initialized.

After the initialization step 44, the program proceeds to a step 46 where the program conditions the controller 20 to allow interrupts to occur and then to a background loop 48 which is continuously repeated. This loop may include, for example, diagnostic routines. In the preferred embodiment of this invention, an interrupt is provided by the CPU at 5 millisecond intervals. Following each interrupt, the execution of the background loop 48 is interrupted and the routines for establishing the hydraulic brake pressure $P_b$ are executed.

Figure 6:
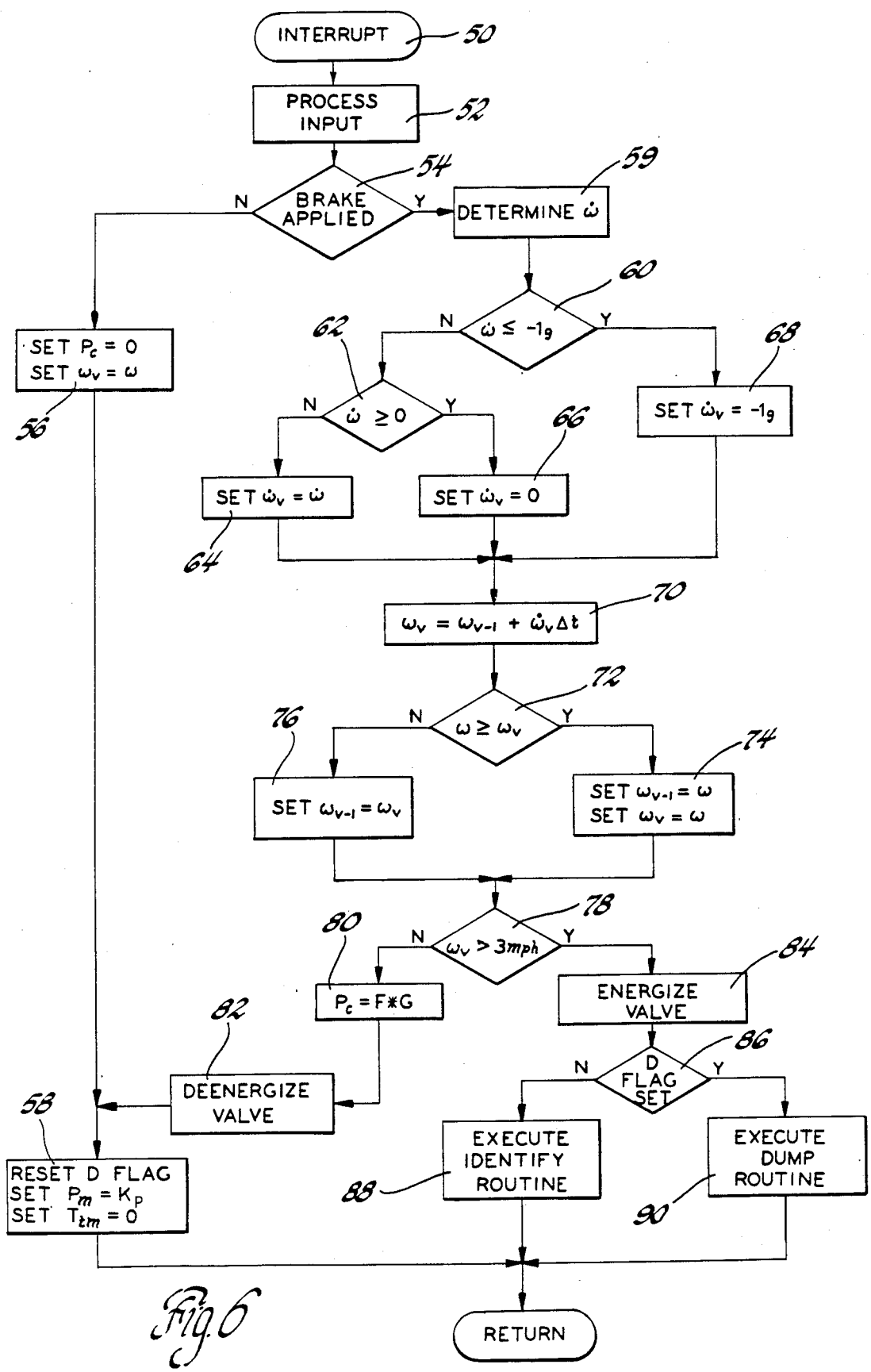

Referring to FIG. 6, the five millisecond interrupt routine for controlling the vehicle brake 10 is illustrated. This routine is entered at step 50 and proceeds to a step 52 where the last measured wheel speed $\omega$ is saved and the new values of wheel speed $\omega$, brake pedal force F and brake line pressure $P_b$ are read and stored in ROM designated RAM memory locations. Next, the program proceeds to a step 54 where it is determined whether or not the operator is commanding brake application. The brakes are considered applied if the value of the brake pedal force F is greater than zero. If the brakes are not applied, the program proceeds to a step 56 where a brake pressure command value $P_c$ is set equal to zero. Also at this step, the speed of the vehicle as represented by the speed $\omega_v$ of a hypothetical unbraked wheel is set equal to the wheel speed measured at step 52. Since the brakes are not applied, the wheel slip is substantially at zero so that the actual and hypothetical wheel speeds can be equated.

From step 56, the program proceeds to a step 58 where a D-flag (represented by the state of a flip-flop or a RAM memory location) is reset to condition the program to execute an identification routine (illustrated in FIG. 7) which identifies the brake pressure producing the critical wheel slip value and therefore the maximum possible braking effort and which establishes the identified brake pressure following the sensing of an incipient wheel lockup condition. As will be described, the D-flag is set following the sensing of an incipient wheel lockup condition in accord with the principles of this invention to condition the program to execute a dump routine (illustrated in FIG. 8) to release the brake pressure and allow the wheel speed to recover. Also at step 58, the maximum allowable brake line pressure $P_m$ is set equal to a calibration constant $K_p$ such as 1500 psi and a RAM memory location storing the value of the maximum calculated tire torque value $T_{tm}$ is set equal to zero. Thereafter, the program exits the 5 millisecond interrupt routine and returns to the background loop 48 of FIG. 5.

The foregoing steps 52 thru 58 are continuously repeated at 5 millisecond intervals as long as the vehicle operator does not command brake application. However, when a force F is applied to the brake pedal, the program proceeds from step 54 to a series of steps that provide an estimation of the value of vehicle speed $\omega_v$ as represented by the speed of a hypothetical unbraked wheel. It is noted that the initial value of $\omega_v$ was set equal to the actual wheel speed $\dot{\omega}$ at step 56 prior to operation of the brake pedal 16. This series of steps begins at step 59 where the rate of change in wheel speed $\omega$ is determined from the old value of wheel speed saved at step 52 and the new value stores at step 52. The determined rate of change of wheel speed is then compared with a constant deceleration of 1g at step 60. The 1g deceleration value represents the maximum possible vehicle deceleration. When wheel deceleration is less than 1g, it is assumed that the vehicle is decelerating at the same rate as the wheel 11. If, however, the wheel deceleration exceeds 1g, it is assumed that the vehicle deceleration remains at the maximum value of 1g.

If the wheel deceleration is less than or equal to 1g, the program proceeds from step 60 to a step 62 where $\dot{\omega}$ is compared to zero. If the comparison indicates wheel deceleration, the program proceeds to step 64 where the rate of change of vehicle speed $\dot{\omega}_v$ is set equal to the actual measured rate of change of wheel speed. If, however, the comparison at step 62 indicates no change in wheel speed or wheel acceleration, the program proceeds to a step 66 where the rate of change of vehicle speeds $\dot{\omega}_v$ is set equal to zero.

Returning to step 60, if it is determined that the wheel deceleration is 1g or greater, the program proceeds to a step 68 where $\dot{\omega}_v$ is set equal to the maximum possible vehicle deceleration of 1g.

From the respective steps 64, 66 or 68, the program proceeds to a step 70 where vehicle speed $\omega_v$ is estimated. This estimation is based on an initial value of vehicle speed $\omega_{v-1}$ determined during the previous execution of the interrupt routine and the rate of change of vehicle speed determined at step 64, 66 or 68 over the five millisecond interval $\Delta t$ between interrupt periods.

From step 70, the program proceeds to step 72 where the actual wheel speed $\omega$ measured at step 52 is compared to the vehicle speed $\omega_v$ determined at step 70. If the wheel speed is equal to or greater than the vehicle speed (which cannot occur during braking of the wheel), the value of vehicle speed is corrected at step 74 by setting the vehicle speed $\omega_v$ equal to wheel speed $\omega$ and the initial vehicle speed $\omega_{v-1}$ to be used at step 70 in the next execution of the interrupt routine is set equal to wheel speed $\omega$. If a step 72 the wheel speed $\omega$ is determined to be less than the vehicle speed $\omega_v$, the program proceeds to a step 76 where the initial vehicle speed $\omega_{v-1}$ to be used at step 70 during the next execution of the interrupt routine set equal to the value of vehicle speed determined at step 70.

Following step 74 or step 76, the program proceeds to a step 78 where the vehicle speed is compared to a calibration constant such as 3 mph. If the vehicle speed is less than 3 mph, the program proceeds to a step 80 where the commanded brake line pressure $P_c$ is set equal to the value of the brake pedal force F times a gain constant G for providing power assisted braking. Thereafter, the program proceeds to a step 82 where the valve 18 of FIG. 2 is deenergized and then to the step 58 previously described.

If the vehicle speed is greater than 3 mph, the program proceeds from step 78 to step 84 where the valve 18 is energized to decouple the master cylinder 14 from the actuator 12. Brake application is thereafter provided solely via the actuator 12 as controlled by the electronic controller 20. From step 84, the program proceeds to a step 86 where the state of the D-flag is sampled. If the D-flag is reset to condition the program to execute the identify routine, the program proceeds to a step 88 where the identify routine is executed.

If step 86 determines that the D-flag is set, the program is conditioned to execute a dump routine, and the program proceeds to a step 90 where the dump routine is executed. During this routine, the pressure to the brake 10 is released to allow the speed of the wheel 11 to recover from an incipient lockup condition. Following the steps 88 or 90, the program exits the 5 millisecond interrupt routine of FIG. 6 and returns to the background loop 48 of FIG. 5.

Figure 7:
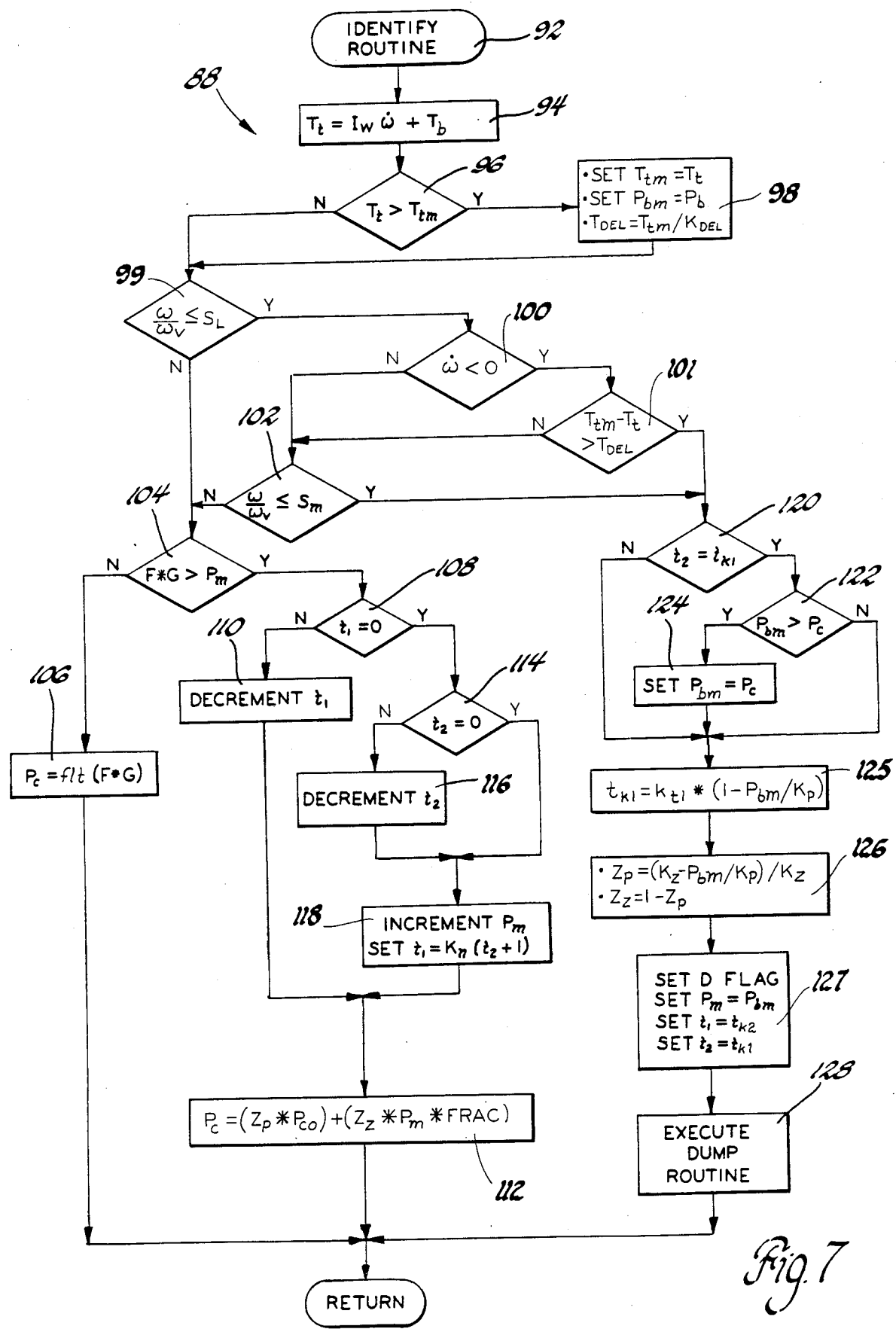

Referring to FIG. 7, the identify routine 88 of FIG. 6 is illustrated. This routine (A) provides for power assisted braking, (B) identifies the brake line pressure producing the critical wheel slip corresponding to the maximum possible braking force between the tire and the road surface, (C) senses an incipient wheel lockup condition and conditions the program to execute the dump routine to allow wheel recovery from the lockup condition and (D) reestablishes the brake line pressure to substantially the identified pressure producing the critical slip value.

The identify routine is entered at point 92 and proceeds to a step 94 where the value of the tire torque $T_t$ is calculated in accord with the equation (4) from the wheel deceleration $\dot{\omega}$ determined at step 59, the brake line pressure $P_b$ measured at step 52 and the known values of wheel inertia $I_w$ and brake gain $K_b$. From step 94, the program proceeds to steps 96 and 98 that function to identify the brake pressure producing the maximum value of tire torque and to determine the decrease in tire torque from the peak value that represents an incipient wheel lockup condition. At step 96, the tire torque $T_t$ calculated at step 94 is compared with the largest previously calculated value $T_{tm}$ stored in memory. If the value calculated at step 94 is greater than the stored value $T_{tm}$, the program proceeds to a step 98 where the stored value $T_{tm}$ is set equal to the larger value calculated at step 94, a stored value of brake line pressure $P_{bm}$ representing the brake line pressure corresponding in time to the stored maximum calculated value of tire torque is set equal to the brake line pressure $P_b$ measured at step 52 and a stored value of the decrease in tire torque $T_{DEL}$ from the stored peak value $T_{tm}$ that represents an incipient wheel lockup condition is updated. In this embodiment, $T_{DEL}$ is a predetermined percentage of the peak calculated tire torque value $T_{tm}$. Accordingly, the value of $T_{DEL}$ stored at step 98 is set equal to $T_{tm}/K_{DEL}$ where $K_{DEL}$ is a calibration constant establishing the percentage drop in tire torque as the wheel slip exceeds the critical slip value that represents an impending wheel lockup condition. For illustration purposes only, $K_{DEL}$ may be 4.0 establishing a 25% decrease in tire torque $T_t$.

The foregoing sequence of steps 96 and 98 are repeated with each execution of the identify routine as long as the tire torque is increasing. If step 96 should determine that the calculated value of tire torque $T_t$ is less than the stored maximum calculated value $T_{tm}$, step 98 is bypassed. This will occur when the brake pressure $P_b$ results in a wheel slip that exceeds the critical value which in turn results in a decrease in the tire torque. The stored value of brake pressure $P_{bm}$ then represents the brake line pressure establishing the critical wheel slip value and therefore the maximum braking effort and the stored value of $T_{DEL}$ is the decrease in tire torque representing an incipient wheel lockup condition.

The program next determines whether or not an incipient wheel lock condition exists. At step 99 the ratio $\omega/\omega_v$ is compared with a reference value $S_L$ above which stable braking takes place. In one embodiment, $S_L$ may equal 0.92 representing 8% wheel slip. A ratio less than $S_L$ indicates a potential for unstable braking. Particularly, if the wheel slip exceeds the value represented by $S_L$ and the wheel is decelerating, a decrease in the tire torque $T_t$ to a value below the stored maximum tire torque value $T_{tm}$ by an amount equal to $T_{DEL}$ is a result of wheel slip exceeding the critical slip value as the wheel decelerates toward a lockup condition.

If step 99 determines that a potential exists for unstable braking, the program proceeds to determine if an incipient wheel lockup condition exists based on the decrease in the tire torque from the peak value (if the wheel is decelerating) or based on the magnitude of wheel slip. Step 100 determines if wheel acceleration is negative. If negative the program proceeds to step 101 to determine if the tire torque $T_t$ calculated at step 94 is less than the peak tire torque $T_{tm}$ stored at step 98 by the value $T_{DEL}$ or greater. If the tire torque $T_t$ has not decreased from the peak value by the value $T_{DEL}$, representing stable braking based on this parameter or if wheel acceleration is not less than 0 as determined at step 100, the program proceeds to step 102 where the ratio $\omega/\omega_v$ is compared with a reference value $S_m$ (such as 0.7) which represents a wheel slip value that exceeds the largest possible critical wheel slip value for any road surface condition. A ratio less than $S_m$ indicates that braking has become unstable and an incipient wheel lockup condition exists.

If either of the steps 99 and 102 indicates a stable braking condition, the program proceeds to a step 104 where the value of the operator requested brake pressure that is equal to the applied pedal force F times the power assist gain factor G is compared with a maximum allowable brake line pressure $P_m$. If the product is less than the maximum value, the program proceeds to a step 106 where the commanded brake pressure value $P_c$ is adjusted toward the operator requested pressure in accord with a first order lag filter equation to provide power assisted braking. Thereafter, the program exits the identify routine and returns to the background loop 48.

If a step 104 it is determined that the operator requested brake pressure is greater than the maximum allowable pressure $P_m$, the program proceeds to a pressure ramp routine where, through repeated executions of the identify routine, the maximum allowable brake pressure $P_m$ and the commanded brake line pressure $P_c$ are ramped up at rates dependent upon the tire-road interface condition until step 104 detects that the maximum allowable brake pressure $P_m$ has become greater than the operator requested pressure or, if the operator requested brake pressure results in an unstable braking condition, until the commanded brake pressure results in an incipient wheel lockup condition at which time the brake pressure establishing the critical slip value has been identified by the steps 96 and 98 as well as the value of $T_{DEL}$ to be used at step 101 in determining whether or not an incipient wheel lockup condition exists. The brake pressure identified is used to reestablish the commanded brake pressure after the wheel recovers from the incipient lockup condition. The result of the ramping of the brake pressure is as periodic low frequency reidentification of the brake pressure producing the critical wheel slip value.

The routine for ramping the brake pressure begins at a step 108 where the value of a time $t_1$ in a RAM timing register is compared to zero. The initial value of time $t_1$ establishes a delay in the ramping of the commanded brake pressure $P_c$. Thereafter, the time $t_1$ functions in establishing the ramp rate. If the time $t_1$ is greater than zero, the program proceeds to a step 110 where the time $t_1$ is decremented. Thereafter, at step 112, the program proceeds to adjust the commanded brake pressure $P_c$ toward a predetermined fraction FRAC of the maximum allowable brake pressure $P_m$ in accord with the first order lag filter equation $$P_c = (Z_p \cdot P_{co}) + (Z_z \cdot P_m \cdot FRAC) \quad (5)$$

where $Z_p$ and $Z_z$ are values established as will be described based on the value of the stored peak brake pressure $P_{bm}$ so that $P_c$ is ramped at a rate dependent upon the road-tire friction coefficient and $P_{co}$ is the prior value of $P_c$. The time constant of this expression is generally small so that the brake pressure $P_b$ is quickly ramped toward the maximum allowable pressure $P_m$. By setting the maximum allowable brake pressure $P_m$ to the stored pressure $P_{bm}$ after an incipient wheel lockup condition is sensed (as will be described), the commanded pressure established upon repeated executions of step 112 will be the predetermined fraction FRAC of the pressure producing the critical wheel slip. In one embodiment, FRAC is 0.9 so that the resultant brake pressure produces substantially the critical wheel slip value.

As long as an incipient wheel lock condition is not detected and the operator requested brake pressure is greater than the maximum allowable brake line pressure $P_m$, the steps 108 thru 112 are repeated at the five millisecond interrupt interval until $t_1$ has been decremented to zero. After $t_1$ has been decremented to zero, the program proceeds from step 108 to step 114 where the time $t_2$ in a RAM timing register is compared to zero. If the time $t_2$ is greater than zero, the program proceeds to a step 116 where the time $t_2$ is decremented.

Following step 116 or step 114, the program proceeds to a step 118 where the maximum allowable brake pressure $P_m$ is incremented and the time $t_1$ is set equal to $K_n(t_2+1)$. Thereafter, the steps 114 thru 118 will be bypassed upon repeated executions of the identify routine until $t_1$ is again decremented to zero. From this it can be seen that the maximum allowable brake pressure $P_m$ is periodically incremented at intervals determined by $K_n$ and $t_2$. When $t_2$ is decremented to zero, the maximum allowable brake line pressure $P_m$ is incremented with each $K_n$ executions of the identify routine. The initial value of $t_2$ is based on the stored peak brake pressure $P_{bm}$ as will be described so that $P_m$ and therefore $P_c$ is ramped at a rate dependent upon the tire-road friction coefficient.

Following step 118, the program proceeds to step 112 where the commanded brake line pressure $P_c$ is again set as previously described. Repeated executions of the foregoing steps function to increase the commanded brake pressure $P_c$ exponentially. This increase will be continued until (A) an incipient wheel lock condition if forced so as to force a reidentification of the brake pressure producing the critical slip value via the steps 96 and 98 or (B) the operator requested brake pressure becomes less than the maximum allowable pressure $P_m$.

If the commanded brake pressure $P_c$ is increased to a point resulting in the wheel slip value becoming greater than the critical slip value, the wheels then quickly approach a lockup condition. This incipient wheel lock condition is detected at step 101 or step 102. As previously indicated, wheel slip exceeding $S_L$ and the wheel decelerating as determined at steps 99 and 100 represent that a decrease in the tire torque from the peak value $T_{tm}$ by an amount equal to $T_{DEL}$ as determined at step 101 is the result of the wheel slip exceeding the critical slip value and an incipient wheel lockup condition exists. Other conditions may be employed in place of those in steps 99 and 100 to indicate that the decrease in tire torque by $T_{DEL}$ determined at step 101 is the result of wheel slip exceeding the critical slip value. For example, the program could determine if wheel slip is increasing at the time tire torque has decreased from the peak value $T_{tm}$ by the amount $T_{DEL}$. The increasing slip with decreasing tire torque represents a condition where the slip is greater than the critical slip value. An incipient wheel lockup condition is also represented if the wheel slip exceeds the calibration value $S_m$ as determined at step 102. When the incipient wheel lockup condition is detected, the brake line pressure $P_{bm}$ in memory at that time is the brake line pressure producing the critical wheel slip value and therefore the maximum possible tire torque.

After a wheel lockup condition has been sensed, the program proceeds to a step 120 where the time $t_2$ is compared with a time $t_{k1}$. As will be seen, these two values will be equal only if a wheel lockup condition is sensed within a predetermined constant time period $t_{k2}$ (such as 500 ms) after the brake pressure is reestablished after recovery from an incipient wheel lockup condition. A wheel lockup occurring within this period after reapplication of the brake pressure implies the application of an unstable brake pressure producing an incipient wheel lockup condition. If this condition exists, the program proceeds to a step 122 where the brake pressure $P_{bm}$, stores at step 98 and identified as the pressure establishing the critical wheel slip value, is compared with the commanded brake pressure $P_c$ which resulted in the incipient wheel lockup condition. If greater, the program proceeds to a step 124 where the stored value of $P_{bm}$ is corrected to the commanded pressure $P_c$. This condition represents an error in the calculation of the tire torque either through changes in the brake line coefficients or errors in various constants used in the determination of the calculation of the tire torque $T_t$. Since the brake line pressure producing the critical slip value can never be greater than the commanded brake line pressure $P_c$ that resulted in an incipient wheel lock condition, the value of $P_{bm}$ is reduced to the value of $P_c$ causing the incipient wheel lock condition.

From step 120 if the time $t_2$ is not equal to $t_{k1}$, from step 122 if $P_{bm}$ is less than $P_c$, or from step 124, the program proceeds to a step 125 where the value of $t_{k1}$ is set equal to $k_{t1} \cdot (1 - P_{bm}/K_p)$ where $k_{t1}$ is a calibration constant and $k_p$ is the limit of the brake pressure as described with respect to step 58. From the above expression, it can be seen that $t_{k1}$ varies inversely with the brake pressure $P_{bm}$ producing the maximum braking effort. As will be seen, this results in a rate of increase in the brake pressure via the steps 114, 116 and 118 that varies directly with the peak calculated tire torque $T_{tm}$ stored at step 98.

At step 126, the values of $Z_p$ and $Z_z$ to be used in the filter equation (5) in step 112 are established. $Z_p$ is set equal to the expression $(K_z - P_{bm}/K_p)/K_z$ where $K_z$ is a calibration constant. In one embodiment, $K_z$ was selected to be 5.0 resulting in $Z_p$ being equal to approximately 0.8 when braking on a surface having a high coefficient. $Z_z$ is set equal to $1 - Z_p$. As can be seen, the values of $Z_p$ and $Z_z$ are dependent upon the identified brake pressure $P_{bm}$ producing the peak tire torque $T_{tm}$ such that the filter equation (5) has a time constant that decreases with increasing values of $P_{bm}$. This results in a more rapid application of brake pressure for road surfaces having a higher coefficient of friction.

At step 127, the D-flag is set to condition the program to execute the dump routine and certain initial conditions for reapplication of brake pressure are established. The initial conditions include setting the maximum allowable brake pressure $P_m$ equal to the stored value of brake pressure $P_{bm}$ (the brake pressure identified as producing the critical wheel slip value), setting the time $t_1$ equal to the constant $t_{k2}$ and setting the time $t_2$ equal to the value $t_{k1}$ previously described which makes the initial value of $t_2$ dependent upon $P_{bm}$ to control the rate of increase of $P_m$ as a function of the road surface condition as previously described.

The program next proceeds to a step 128 where the dump routine is executed. Thereafter, during executions of the 5 ms interrupt routine of FIG. 6, the identify routine is bypassed via the step 86 and the dump routine 90 is executed until the D-flag is again reset.

The dump routine executed at step 128 of the identify routine of FIG. 7 and at step 90 of the interrupt routine of FIG. 6 is illustrated in FIG. 8. This routine is entered at point 130 and proceeds to step 131 where wheel slip represented by the ratio of wheel speed $\omega$ to the speed $\omega_v$ of the hypothetical unbraked wheel is compared to a constant $S_k$ representing wheel speed approaching vehicle speed. $S_k$ may be, for example, 0.92 representing a wheel slip of 8 percent. If the ratio is less than $S_k$, the program proceeds to a step 132 where wheel acceleration $\dot{\omega}$ is compared with a low value $\dot{\omega}_L$ such as a value representing 1g. If the wheel speed has not yet begun to accelerate at this level in its recovery from the incipient lockup condition, the program proceeds to a step 134 where the commanded brake pressure $P_c$ is set to zero to allow the wheel speed to recover from the incipient wheel lockup and toward vehicle speed. From step 134, the program compares at step 136 the time $t_R$ that the brake pressure has been dumped with a maximum allowable time $K_R$ beyond which the brake pressure is to be reapplied even if recovery from the lockup condition has not been detected. If the time period $K_R$ has not been exceeded, the time $t_R$ is incremented at step 138 and the program returns to the background loop 48 of FIG. 5.

Returning to step 132, if the wheel acceleration $\dot{\omega}$ has exceeded $\dot{\omega}_L$, the commanded brake pressure $P_c$ is set at step 140 equal to the then existing brake pressure $P_b$ to effect a hold of the brake pressure until wheel speed recovery is detected.

At step 142, the present wheel acceleration $\omega_t$ is compared to the previous wheel acceleration $\omega_{t-1}$. If wheel acceleration is increasing indicating that the wheel slip is still decreasing toward the critical slip value, the program proceeds to the step 136 previously described.

If step 131 detects wheel speed recovery based on wheel slip decreasing to a value below that represented by $S_k$ or if step 142 detects that the wheel slip is less than the critical slip value represented by a decrease in wheel acceleration or if step 136 detects a brake pressure dump duration exceeding $K_R$, the program proceeds to a step 144 where the D-flag is reset to condition the program to execute the identify routine of FIG. 7. Also at this step, the maximum value of calculated tire torque $T_{tm}$ is set to zero so that the identify routine is conditioned to reidentify the brake pressure establishing the critical wheel slip value, the hypothetical unbraked wheel speed $\omega_v$ is set equal to the last measured wheel speed $\omega$ and the time $t_R$ is reset. The program then exits the dump routine of FIG. 8 and returns to the background loop 48.

During the following executions of the 5 millisecond interrupt routine of FIG. 6, the program executes the identify routine at step 88 until the D-flag is again set at step 127 after an incipient wheel lockup condition is sensed.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. The method of detecting an incipient wheel lockup condition of a braked wheel of a vehicle traveling over a road surface, the method comprising the steps of:
    monitoring the value of tire torque tending to accelerate the wheel during braking;
    identifying the maximum tire torque value monitored each time the wheel is braked;
    monitoring the value of slip between the wheel and the road surface; and
    indicating an incipient wheel lockup condition when the monitored value of tire torque becomes less than the identified maximum tire torque value by a predetermined amount during a predetermined condition of the value of slip between the wheel and the road surface.

2. The method of claim 1 wherein the predetermined amount is a predetermined percentage of the identified maximum value of tire torque.

3. The method of claim 2 wherein the predetermined condition of the value of slip is the value of slip exceeding a predetermined amount.

4. The method of claim 2 wherein the predetermined condition of the value of slip is an increasing value.

5. A wheel lock control system for limiting the brake pressure applied to the brakes of a vehicle wheel having a tendency to lock up as the slip between the wheel and a road surface increases beyond a critical slip value, the system comprising:
    means for monitoring the value of tire torque tending to accelerate the wheel during the application of brake pressure;
    means for identifying the maximum tire torque value monitored following each application of brake pressure and the brake pressure corresponding in time thereto;
    means for indicating an an incipient wheel lockup condition when the monitored value of tire torque decreases by a predetermined amount from the identified maximum tire torque value as the wheel slip increases from the critical slip value; and
    means for reapplying the brake pressure following said indicated incipient wheel lockup condition with substantially the last identified value of brake pressure.

6. A wheel lock control system for limiting the brake pressure $P_b$ applied to the brakes of a vehicle wheel having a tendency to lock up as the slip between the wheel and a road surface increases beyond a critical slip value, the system comprising:
    means for estimating the tire torque $T_t$ tending to accelerate the wheel during the application of brake pressure in accord with the expression $$T_t = I_w \dot{\omega} + P_b K_b$$

where $\dot{\omega}$ is the wheel angular acceleration, $I_w$ is the wheel moment of inertia and $K_b$ is a constant;
    means for identifying a maximum value $T_{tm}$ of the value of the estimated tire torque $T_t$ following each application of brake pressure and the brake pressure value $P_{bm}$ corresponding in time thereto;
    means for indication an incipient wheel lockup condition when the estimated tire torque $T_t$ decreases from the identified maximum tire torque value $T_{tm}$ by an amount equal to $T_{tm}/K_{DEL}$ as the wheel slip increases from the critical slip value where $K_{DEL}$ is a constant; and
    means for reapplying the brake pressure following a detected incipient wheel lockup condition with substantially the identified value of brake pressure $P_{bm}$.

* * * * *